(12) United States Patent
Van Der Weijde

(10) Patent No.: US 12,722,513 B2
(45) Date of Patent: Sep. 1, 2026

(54) METHOD AND DEVICE FOR CONNECTING A CONNECTOR OF AN ELECTRIC VEHICLE CHARGER TO A SOCKET ON AN ELECTRIC VEHICLE

(71) Applicant: ROCSYS B.V, Rijswijk (NL)

(72) Inventor: Johannes Oosten Van Der Weijde, Rijswijk (NL)

(73) Assignee: ROCSYS B.V., Rijswijk (NL)

( * ) Notice: Subject to any disclaimer, the term of this patent is extended or adjusted under 35 U.S.C. 154(b) by 785 days.

(21) Appl. No.: 18/020,992

(22) PCT Filed: Aug. 6, 2021

(86) PCT No.: PCT/NL2021/050495
§ 371 (c)(1),
(2) Date: Feb. 13, 2023

(87) PCT Pub. No.: WO2022/045881
PCT Pub. Date: Mar. 3, 2022

(65) Prior Publication Data
US 2023/0286401 A1 Sep. 14, 2023

(30) Foreign Application Priority Data
Aug. 28, 2020 (NL) ..................................... 2026365

(51) Int. Cl.
*B60L 53/37* (2019.01)
*B60L 53/16* (2019.01)
(Continued)

(52) U.S. Cl.
CPC ............... *B60L 53/37* (2019.02); *B60L 53/16* (2019.02); *H01R 13/631* (2013.01); *H01R 43/26* (2013.01);
(Continued)

(58) Field of Classification Search
CPC .......... B60L 53/37; B60L 53/16; B60L 53/66; H01R 13/631; H01R 43/26; H01R 2107/00; H01R 2201/16
(Continued)

(56) References Cited

U.S. PATENT DOCUMENTS 9,266,440 B2 * 2/2016 Gao ........................ B60L 53/35
2013/0076902 A1 * 3/2013 Gao ..................... B25J 17/0208
348/148
(Continued)

FOREIGN PATENT DOCUMENTS

DE 102018104759 A1 9/2019
WO 2020/222640 A1 11/2020
WO 2020/239871 A1 12/2020

OTHER PUBLICATIONS

International Search Report dated Aug. 31, 2021, Application No. PCT/NL2021/050495).
(Continued)

*Primary Examiner* — Suchin Parihar
(74) *Attorney, Agent, or Firm* — The Dobrusin Law Firm, P.C.

(57) ABSTRACT

Method and device for connecting a connector of an electric vehicle charger to a socket on an electric vehicle, comprising the steps of: A. determining the supposed position and orientation of the socket; B. moving the connector in the direction of the supposed position of the socket; C. positioning the connector adjacent to the supposed socket position of the connector, with at least one angular rotation about an axis not parallel to the direction of the unique movement with respect to the mutual orientation of the connector and socket wherein the respective centre lines of the pins and holes of at least two pin-and-hole connection pairs coincide; D. taking away the angular difference between the supposed
(Continued)

Figure 1A:
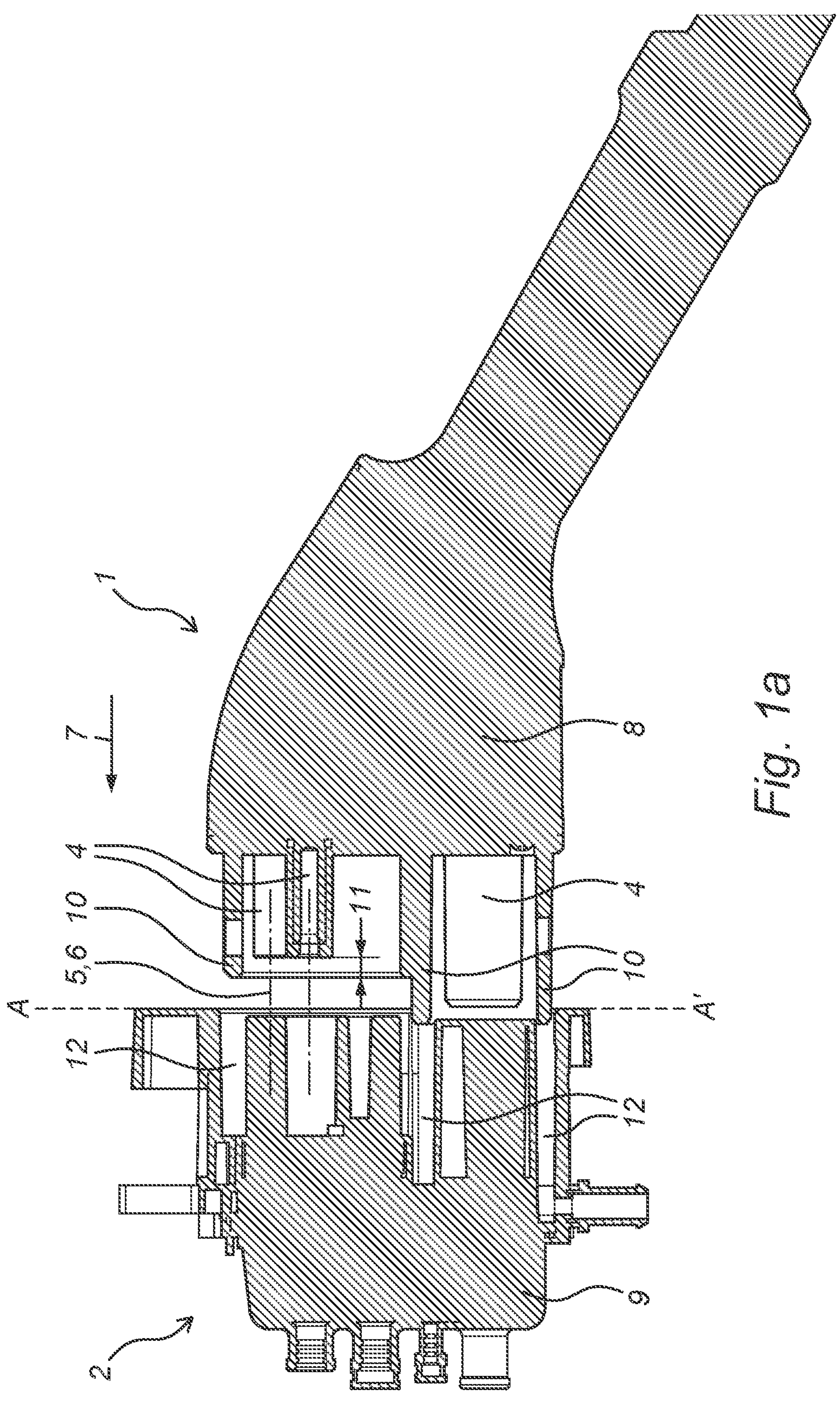

and the actual position and orientation; E. connecting the connector and socket by performing the unique movement directed towards each other.

16 Claims, 8 Drawing Sheets

(51) Int. Cl.
*B60L 53/66* (2019.01)
*H01R 13/631* (2006.01)
*H01R 27/02* (2006.01)
*H01R 43/26* (2006.01)
*H01R 107/00* (2006.01)

(52) U.S. Cl.
CPC ............... *B60L 53/66* (2019.02); *H01R 27/02* (2013.01); *H01R 2107/00* (2013.01); *H01R 2201/26* (2013.01)

(58) Field of Classification Search
USPC .......................................................... 320/109
See application file for complete search history.

(56) References Cited

U.S. PATENT DOCUMENTS

2014/0111144 A1* 4/2014 Mo ......................... B60L 53/16 320/107
2015/0162707 A1* 6/2015 Yuasa ..................... B60L 53/16 439/372
2017/0166070 A1 6/2017 Dunger
2019/0340782 A1* 11/2019 Sinha ........................ G06T 7/13
2020/0189413 A1 6/2020 Fagan
2021/0001736 A1 1/2021 Schoob et al.
2022/0200205 A1* 6/2022 Steinbuchel, IV ... H01R 13/623
2024/0246438 A1* 7/2024 van Deurzen .......... B60L 53/36

OTHER PUBLICATIONS

Pratt G. A. et al: “Series Elastic Actuators” Proceedings of the 1995 IEEE/RSJ International Conference on Intelligent Robots and Systems. IROS 95. Human Robot Interaction and Cooperative Robots. Pittsburgh, Aug. 5, 1995.

* cited by examiner

D
18
19
12
12
D
DC+
DC-
2

METHOD AND DEVICE FOR CONNECTING A CONNECTOR OF AN ELECTRIC VEHICLE CHARGER TO A SOCKET ON AN ELECTRIC VEHICLE

The present invention relates to a method and device for connecting a connector of an electric vehicle charger to a socket on an electric vehicle. Devices for this purpose are known in the art, for instance from the international patent application PCT/NL2020/050266 from the same applicant.

Charge cables of chargers for charging electric vehicles are commonly provided with connectors, also referred to as plugs or couplers, for being plugged into sockets provided on the electric vehicles. The connectors may be of a multi-pole type, that is, designed for establishing multiple connections when connected to a socket. The connections may serve for AC or DC power connections for (dis-) charging of vehicle batteries, and/or for data exchange between the charger and the vehicle, and in particular a battery management system of the vehicle. The connector and socket may comprise pin-and-hole connections, wherein both connector and socket may have a combination of both pins and holes.

Connectors and sockets for charging of electric vehicles have been standardised. Types that are commonly used nowadays are described in standards such as IEC 62196 and SAE J1772. The connectors and socket types in these standards are referred to as CCS-1, CCS-2, type-1, type-2, type-3, CHAdeMO and GB/T (also described in GB/T 20234.3). Other standardized EV charging connectors include for example the newly defined ChaoJi connector intended for use in the Chinese and Asian region, the Euro-Din according to DIN VDE 0623-589 which is used on low-voltage vehicles such as forklifts and the future HPCCV connector intended for use in heavy electric vehicles such as trucks and busses. In particular the CCS-2 type of connector and socket have gained popularity in Europe. Besides a multi-pole electric connection, the connector and the socket establish a mechanical connection, which ensures that the correct poles are paired, and keeps the electrical connection engaged during a charging performance. In order to maintain the mechanical connection, the connectors have a tight fit, that clamps the connector in the socket. The afore mentioned standards and connectors and sockets are in particular intended for placement in or on the vehicle body or carrosserie, and normally be placed at a side, or possibly on top of the vehicle.

These connectors are not specifically intended for use below the vehicle, that is against or integrated in the vehicle bottom, or in or against its chassis. The (method according to the) present invention may therefore explicitly not be intended for connections under a vehicle and/or against the bottom or chassis of the vehicle.

Connectors according to the standard may have chamfers for guidance, and a "loose" fit in an initial phase of insertion into a socket. Nevertheless, inserting a standard electric-vehicle connector into a socket is usually a high-precision task which requires accurate positioning of the connector to be inserted. Additionally, in practical situations there can be unexpected pose (position/rotation) changes of the socket on the vehicle during the insertion process (entering or exiting of people, loading and unloading of cargo, wind loads, etc.).

It is a goal of the present invention to reduce the requirement of highly accurate pose estimation methods, which are complex and as a result also expensive, and/or to reduce the requirement of extremely accurate robots, which have the same disadvantages of being complex and expensive, despite uncertainties of the position and orientation of the socket and connector. The invention further aims to provide a solution to be more tolerant to unexpected motions during the insertion process, more specifically during the last phase of the insertion process (after the last pose estimation). In general it is a goal of the invention to provide a useful alternative to the state of the art.

The invention relates to connecting a connector of an electric-vehicle charger to a socket on an electric vehicle with a supposed position and orientation, wherein the connector and the socket each have multiple poles that are electrically mutually connectable by establishing electrically conductive pin-and-hole connection pairs, wherein the connector comprises a pin and the socket an associated hole, and/or the connector comprises a hole and the socket an associated pin, wherein each pin-and-hole has a centre line extending axially from the centre of the pin or hole concerned, which centre lines are parallel and wherein the connector and the socket are connectable by one unique movement directed towards each other.

This unique movement has a direction parallel to the direction of the centre lines of the pins and holes, and a mutual orientation of the connector and socket wherein the respective centre lines of the pins and holes of at least two pin-and-hole connection pairs coincide and wherein the connector and the socket each comprise a housing where the connector and socket housings are connectable by the same unique movement directed towards each other and wherein the connector and/or the socket comprise mechanical guiding portions, protruding in a direction parallel to the direction of the centre lines beyond the end of the pins.

The directions and orientations mentioned apply to the last part of the establishment of a physical connection, wherein at least part of the connector and socket housing are in touch with each other.

The aforementioned standards fulfil the above restrictions, but the invention is not limited to these standards.

The method according to the invention comprises the steps of:

A. determining the supposed position and orientation of the socket;
B. moving the connector in the direction of the supposed position of the socket with the aid of an automated actuator and/or manipulator;
C. positioning, with the aid of an or said automated actuator and/or manipulator, the connector adjacent to the supposed socket position of the connector, with at least one angular rotation about an axis not parallel to the direction of the unique movement with respect to the mutual orientation of the connector and socket wherein the respective centre lines of the pins and holes of at least two pin-and-hole connection pairs coincide;
D. taking away the angular difference between the supposed and the actual position and orientation;
E. connecting, with the aid of an or said automated actuator and/or manipulator, the connector and socket by performing the unique movement directed towards each other.

Steps A-E may also be referred to as the plug-in sequence.

In this application, just like anywhere else, an axis not parallel to a direction means that there is an angle with an absolute value larger than 0 between the axis and the direction. As a result, not parallel is not a negative definition but an exclusion of a set of directions, being those that are parallel (including the one that coincides).

The method according to the invention provides the benefit that the alignment of six degrees of freedom (6DOF) required prior to performing the unique movement to connect the connector and the socket are no longer required simultaneously, but can be met in steps. The coupling procedure is performed in such a way that the shape of the connector guides the alignment, whether especially designed for that purpose or not.

In state of the art methods it is tried to align and plug in the entire connector in one go, having to aim at a lot of places at the same time exactly between certain boundaries of the connector or the socket, which requires the simultaneous alignment of larger surfaces within certain boundaries of the connector or socket, rather than small surfaces, or even lines or points.

By applying an intentional rotational misalignment, the procedure can be started by first aiming a part, for instance a protruding part such as an edge of the connector, at a predetermined location of the socket, which may for instance be an edge, or between a slit or gap of the socket. In other words, the method may comprise as a step, positioning a part of the connector between geometric boundaries of the vehicle socket. Such slit or gap may as such be relatively spacious with respect to a protruding part of the connector, and because it is not tried to aim exactly in the gap at other places (i.e. parts of the socket), even with a misalignment, a first part of the positioning is possible, because there are less constraints and the remaining constraints may allow for a larger error. Alternatively, the method be considered as partially mating the connector and socket, such that they partially make contact, wherein convex hulls overlap, followed by aligning the centre lines of the pin-and-hole pairs, thus taking a way the intentional misalignment. The misalignment or bias may be designed depending on connector and socket geometry and an angle of attack, which means that apart from an intentional rotational misalignment, there may also be an intentional translation misalignment applied in one direction to facilitate the plug-in sequence with a rotational misalignment.

Once part of the connector is in the slit or gap, the connector is limited in its freedom to move by the shape of the vehicle connector and the shape of the connector. This simplifies the alignment of the remaining degrees of freedom, which might be aided by mechanically guiding surfaces of the connector and socket.

In the sense of the present invention, adjacent is to be understood as at a mutual distance of less than 10 cm, preferably and/or commonly less than 5 mm, and more preferably in mechanically touching contact.

In a first embodiment of the invention, steps D and E may take place sequentially. That is: taking away the angular difference between the supposed and the actual position and orientation may be done before connecting the connector and socket by performing the unique movement directed towards each other. In this embodiment, step D may be performed by the automated actuator and/or the manipulator.

Step D may be triggered by the detection of the connector touching the socket, or by the determination or detection that a smallest distance between a part of the connector and a part of the connector has reached a predetermined threshold, such as less than 5 mm or more in particular less than 1 mm.

This may for instance be done when information about mechanical contact is obtained, or if (updated) camera information reveals that the alignment is within certain boundaries, or when the connector is for instance partly positioned in a slit or gap of the socket or against a known or determined part of the socket that may from then on serve as a reference.

The connector may then be rotated toward the aligned orientation when it is partly positioned in the socket. A complete positioning in (and connection with) the socket is not yet possible at this stage because of the intentional misalignment but can take place once the aligned orientation is reached.

In an alternative embodiment, steps D and E take place at least partly simultaneously, in particular while applying a force and/or torque with at least a directional component in the direction of the unique movement directed towards each other.

This may preferably, but not necessarily be done while exerting a force and/or torque with at least a directional component corresponding with the unique movement.

The method according to the invention may or may not comprise actively rotating the connector by performing a manipulation rotating the connector. While this may be a preferred embodiment, it is also possible that the rotation is a result of a movement in the direction of the unique movement directed towards each other, and/or be (the result of) a form-following movement.

In a yet further preferred embodiment of the method according to the invention, the angular rotation takes place about an axis perpendicular to the direction of the unique mutually directed movement, when such rotation has shown to result in a suitable part of the connector protruding in a direction of the socket, for engaging the socket at first, and forming a reference for the further connection movement.

Step D may then for instance take place while the connector is rotating about one or more contact points or lines with the socket. These one or more contact points may be (connected by a virtual) line, and may—in particular gradually—vary during steps D and E.

Step D may take place by active rotational manipulation of the connector, for instance by an actuator or by a robot (part). For example, this may be done when there are no or no suitable guiding surfaces on the connector and/or socket available, when in increased speed is desired or required, or when the allowable force exerted by the connector on the socket is limited. Active rotational manipulation is to be understood as applying a torque or a force that directly results in a rotation.

Alternatively, step D takes place by passive manipulation, more in particular as a result of step E, for instance by making use of compliance, particularly mechanical compliance, when manipulating the connector. In such embodiment, a force is applied that is not or not solely in the direction of the resulting rotation, but the rotation is caused by the guidance of the connector and/or socket housing, while a device for manipulating the connector allows certain freedom in at least directions different from a direction in which a force or torque is applied. Compliance of the manipulator may be adapted or provided for this purpose. In general, the term passive manipulation is used here to indicate that there is no directly controlled rotation.

In a further embodiment of the invention, the connector is placed adjacent to the supposed position of the socket, also under a translation in addition to the intended rotation. Dependent on the form of the connector and/or the socket, an intentional translation in a predetermined direction and over a predetermined distance, may help further alignment and positioning of the connector and socket.

The supposed position and orientation may be determined on the basis of data derived from a fixed parking position, known geometry of the vehicle and repeatable sufficiently accurate parking, for instance when there is a predetermined charging location at which the vehicle is parked, or more in particular when the parking takes place automatically, for instance because the vehicle is equipped with an automated parking functionality. Alternatively, data may be provided by the vehicle, which may also be data from parking sensors, which may also be used for automated parking purposes. The sensors may further comprise cameras, on the vehicle or on a charging facility, and/or on a manipulator for the connector and/or contact-sensors may be used, on or coupled to the connector and/or the socket.

In yet a further embodiment, the supposed position and orientation of the socket is redetermined or recalculated during the plug-in sequence, and the movement may be adjusted based on updated information of the supposed position.

The invention may be applied in combination with a CCS connector, wherein the angular rotation is between 0 and 20 degrees about an axis of rotation parallel to a connection line between the ends of the DC charging pins of the CCS connector, and in particular between 1 and 5 and more particularly around 3 or in particular between 12 and 18 degrees and more particularly around 15 degrees.

It may also be applied when the connector is a type 1 connector, a type-2 connector, a CHAdeMO connector, a GB/T connector, an Euro DIN connector, or when the connector is a ChaoJi connector, or a HPCCV connector.

In general, part of the connector body may protrude into or over a convex hull (bounding-box) of the socket before rotating to get to a final alignment. This protrusion limits movement of at least one degree of freedom, at least partially constraining the movement of the connector.

The invention also relates to a device for performing a method as described above, comprising a manipulator for moving a connector of an electric vehicle charger having a socket on an electric vehicle in an assumed position and orientation, wherein the manipulator is adapted to move the connector. Such manipulator may be, but is not limited to the device described in the international patent application PCT/NL2020/050266 from the same applicant, which is herein incorporated by reference.

The manipulator may be adapted to move the connector in at least 3, preferably at least 4 and more preferably at least 5 degrees of movement, and it may be provided with a compliance in at least every degree of freedom in which the manipulator is not adapted to move the connector. The compliance may be, but is not limited to the type that is disclosed in the international patent application PCT/NL2020/050266 from the same applicant.

A manipulator for moving the connector may be configured to perform a form-following movement to get the connector in the insertion direction. This can be both passive and active. In a passive embodiment the manipulator may be provided with a passive compliance assembly (e.g. a spring assembly) that is designed in such a way that it solves an intentional mis-alignment, or in particular an intentional mis-rotation properly. This embodiment can be applied with relatively small misalignments of a few degrees, for example up to 5 degrees, wherein the compliance passively straightens things out.

Figure 1B:
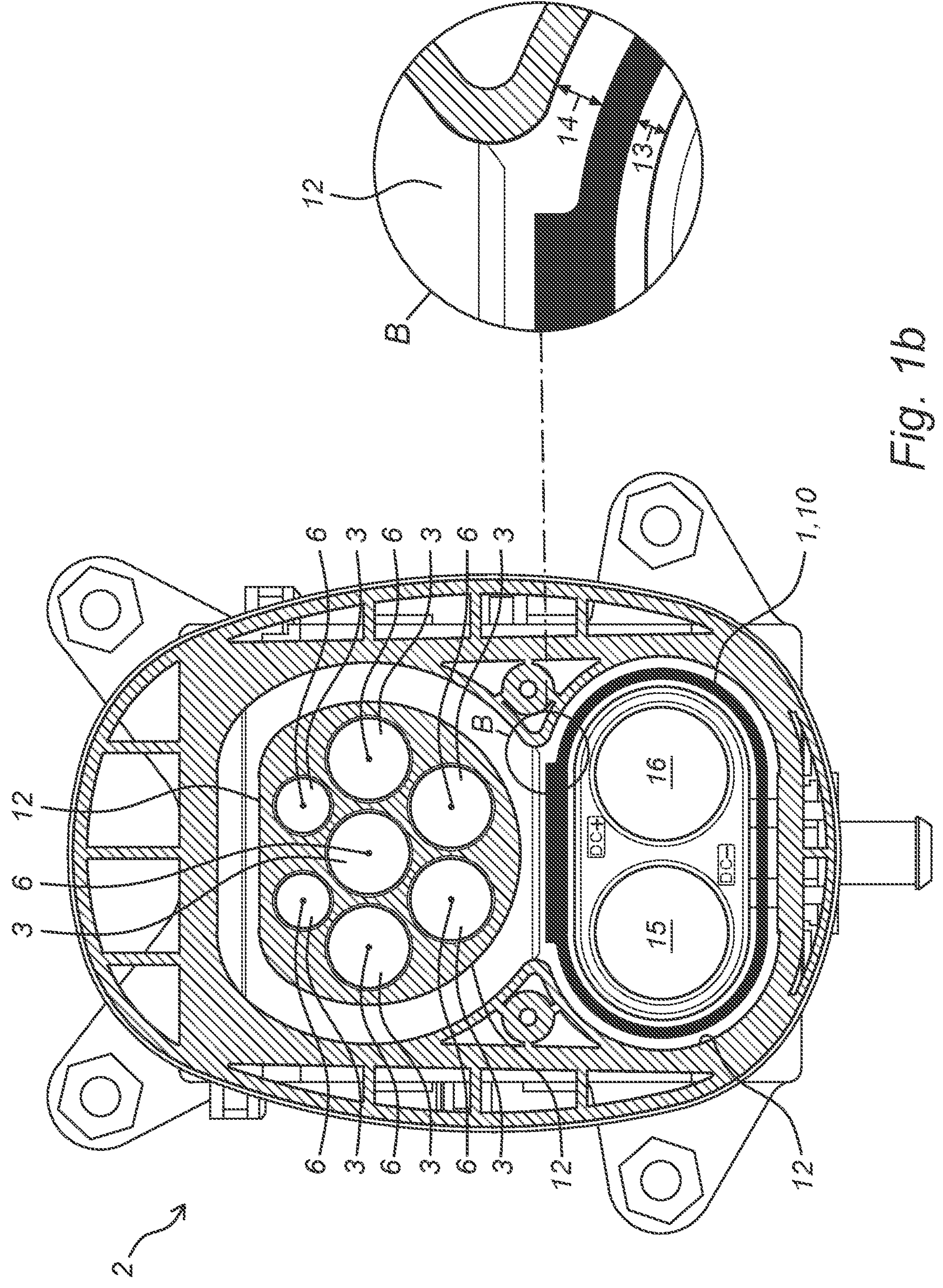
Figure 2A:
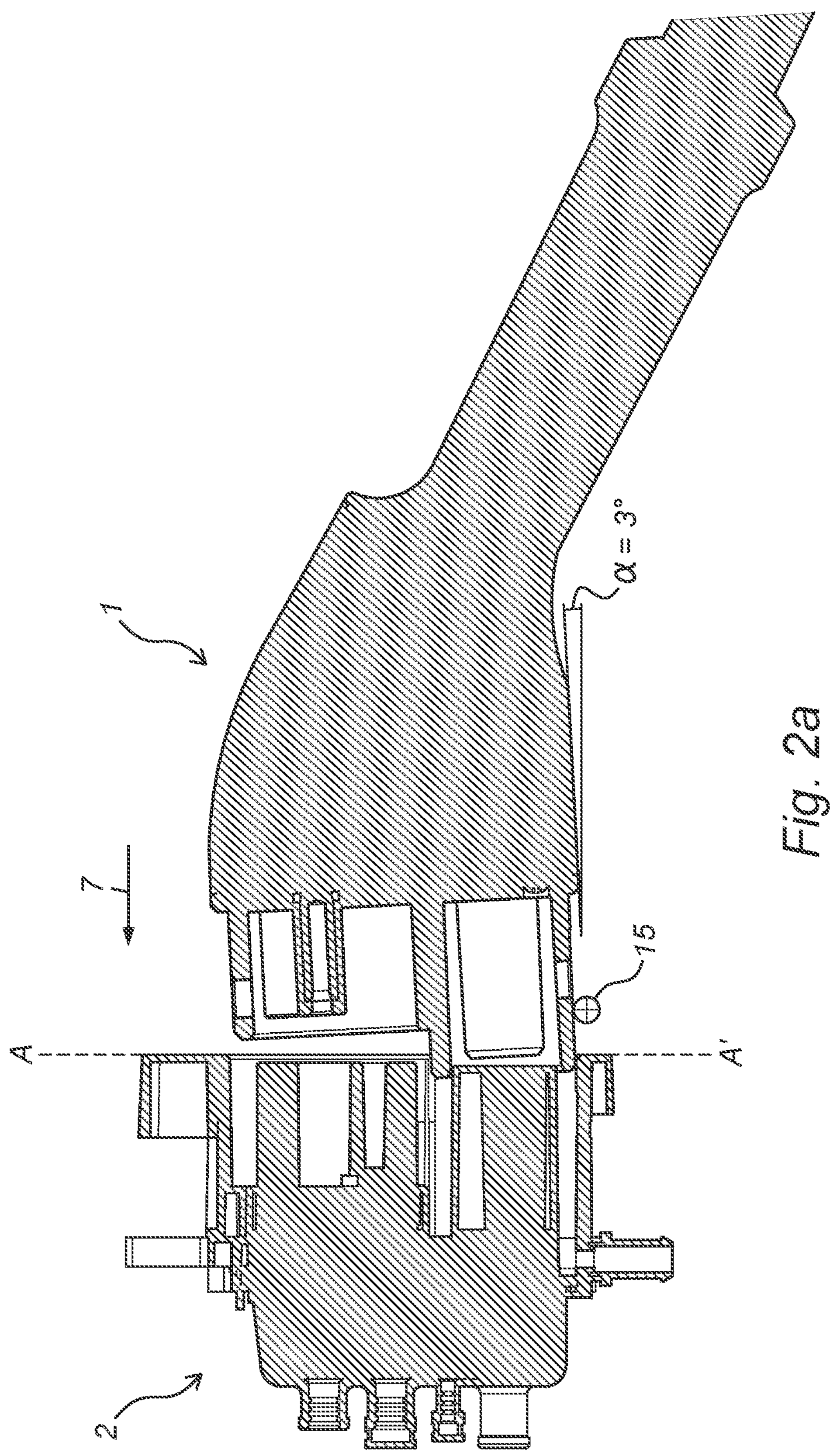
Figure 2B:
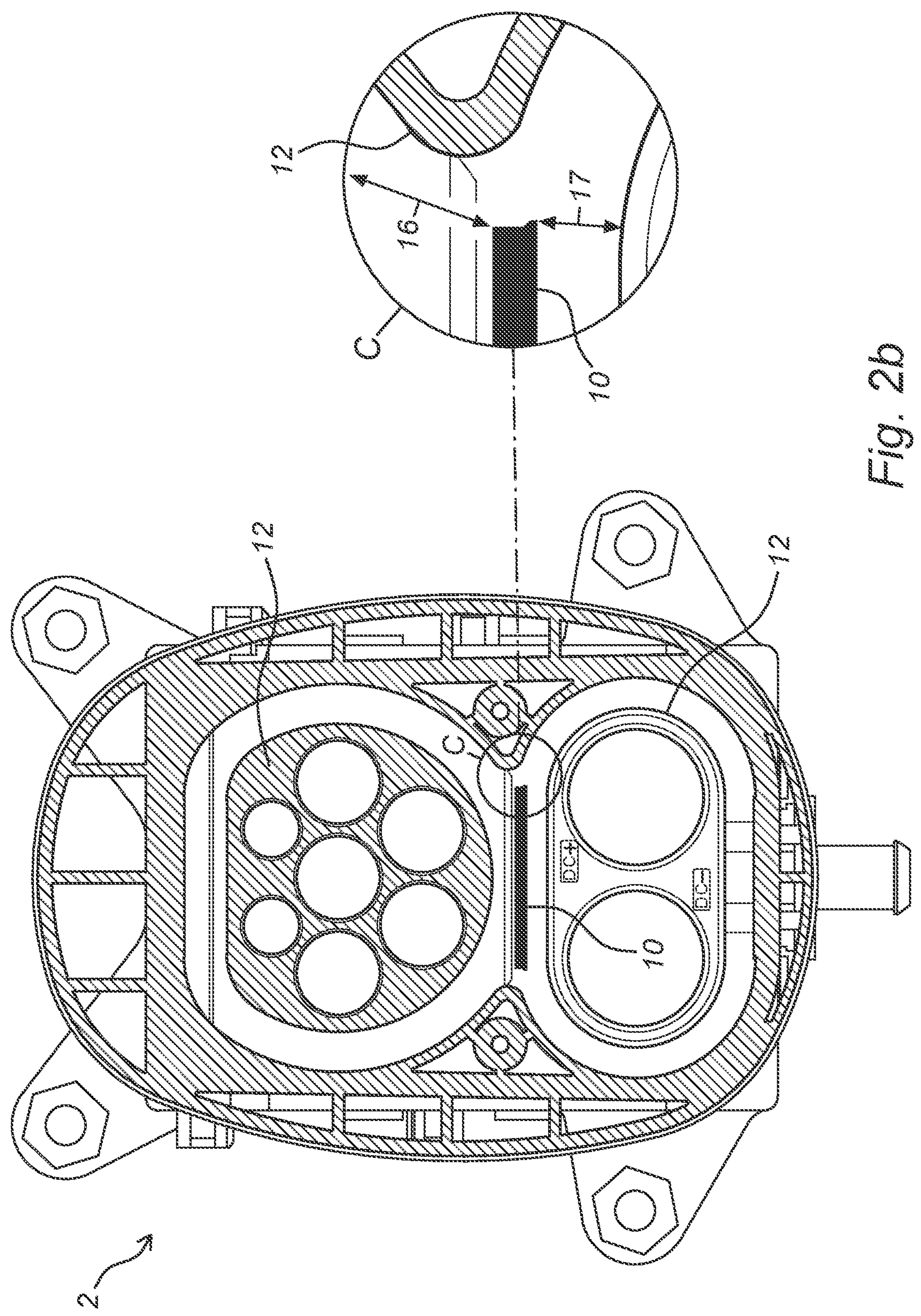
Figure 3A:
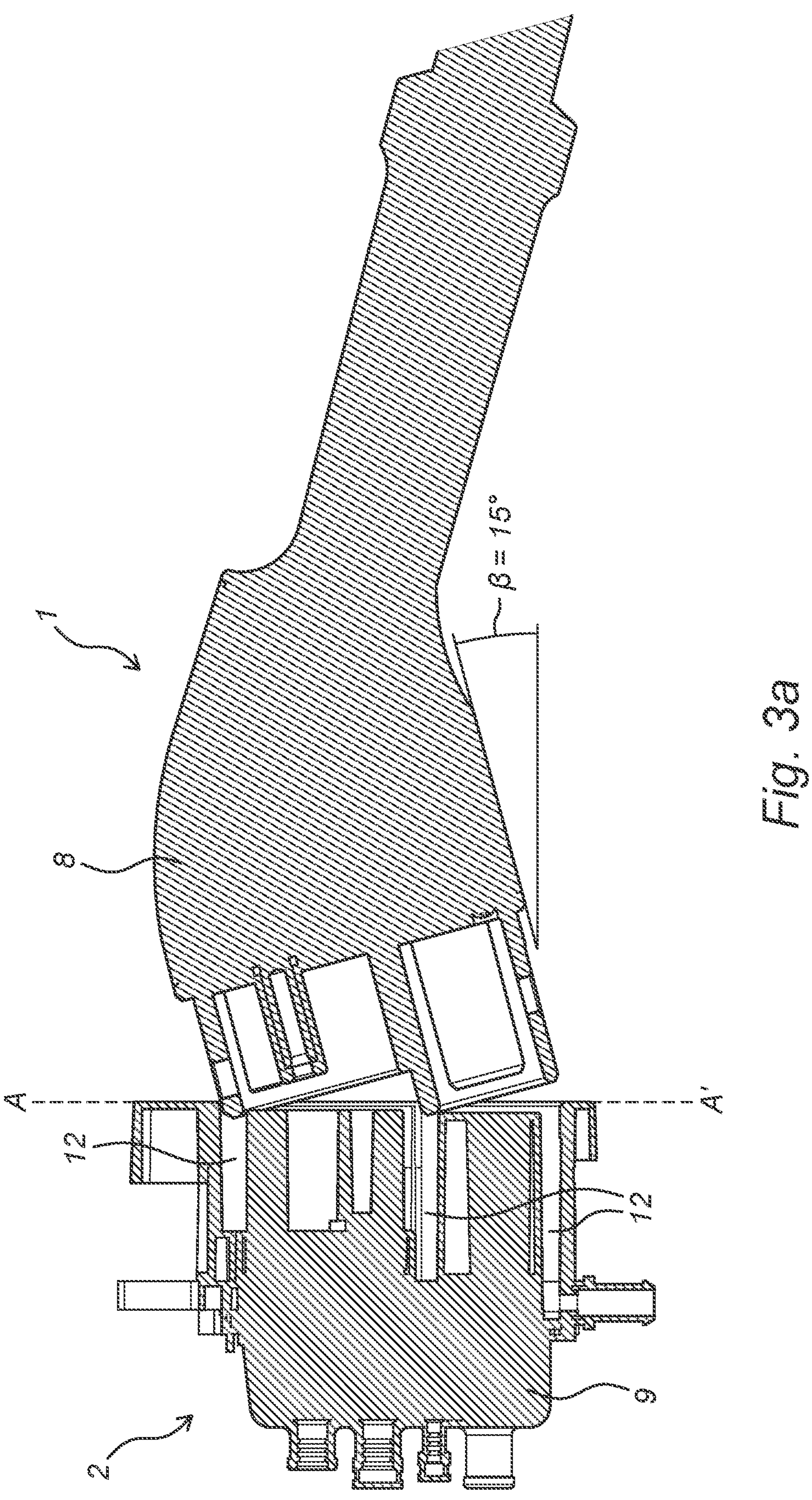
Figure 3B:
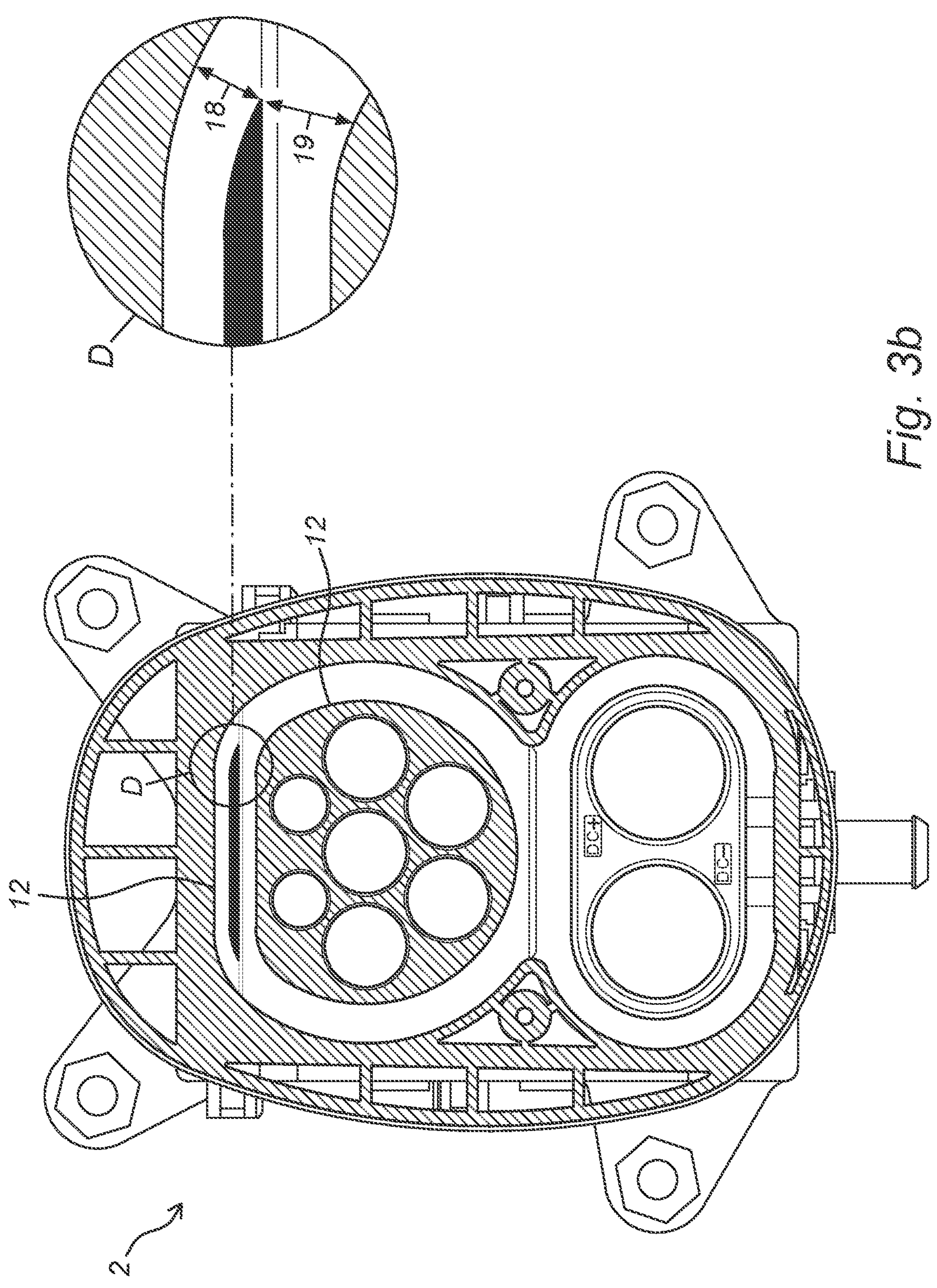

The invention may now be elucidated into more detail with reference to the following figures, wherein:

FIGS. 1*a* and 1*b* show a front view and a cross section of a method for connecting a connector to a socket according to the state of the art;

FIGS. 2*a* and 2*b* show a front view and a cross section of a method for connecting a connector to a socket according to the present invention;

FIGS. 3*a* and 3*b* show a front view and a cross section of a method for connecting a connector to a socket according to the present invention; and FIGS. 4*a-d* show cross sections of a method for connecting a connector to a socket according to the present invention.

FIGS. 1*a* and *b* show a connector 1 of an electric vehicle charger, connectable to a socket 2 on an electric vehicle (not shown) with a supposed position and orientation (the ones shown), wherein the connector 1 and the socket 2 are electrically mutually connectable in multi-pole by establishing electrically conductive pin 3-and-hole 4 connection pairs, wherein in the case shown the connector is a CCS 2 standard type that comprises holes 4 and the socket comprises associated pins 3, wherein each pin has a centre line 6 extending axially from the centre of said pin and each hole has a centre line 5 from said hole concerned, which centre lines 6 (of all pins 3) are parallel and which centre lines 5 (of all holes 4) are parallel, wherein the connector 1 and the socket 2 are connectable by one unique movement directed towards each other, which movement has a direction 7 parallel to the direction of the centre lines 5, 6 of the pins 3 and holes 4, and a mutual orientation of the connector 1 and socket 2 wherein the respective centre lines 5, 6 of the pins 3 and holes 4 of at least two pin-and-hole connection pairs coincide. The connector 1 and the socket 2 each comprise a housing 8, 9 where the connector and socket housings 8, 9 are connectable by the same unique movement 7 directed towards each other and comprise mechanical guiding portions 10, 12, protruding 11 in a direction parallel to the direction of the centre lines 5, 6 beyond the end of the pins.

The mutual orientation of the connector 1 and the socket 2 is "aligned", which means that when the connector is moved in the direction 7, the connector and socked are connected, or in other words, the connector is plugged in.

FIG. 1*b* shows a sectional view corresponding with the line A-A' in FIG. 1*a*, which is taken exactly in a front plane of the socket 2, being the part of the socket surrounding the DC pins. The DC pins are slightly deeper than the AC pins, which in turn are deeper than the front face. The connector is in the position of FIG. 1*a*, which means that protrusion 10 extends in a slit or gap 12 of the socket. The protrusions 10 and the slits or gaps 12 the cooperate therewith, form in this case the mechanical guiding portions for mutually positioning the connector 1 and the socket 2.

In FIG. 1*b* it is clearly visible, that in order to connect the connector 1 and the plug 2, the protrusion 10 of the connector should be brought within the geometric boundaries of the socket, formed by the edges of the slit or gap 12. Detail B shows that the tolerances 13, 14 for establishing the connection are very small, and as can be seen from the overall geometry of the corresponding oval parts of the connector 1 and the socket, enclosing the DC charging pins 15, 16. For an automated connection, coupling or plugging of the connector 1 and socket 2, these small tolerances and complex positioning requirements, form an impediment that sets restrictions to the techniques that can be applied, and the speeds they can be operated with.

The method according to the invention, takes away these disadvantages, as will become clear from FIGS. 2*a*, *b* and FIGS. 3*a*, *b*, in which the same CCS 2 connector and socket are connected, but taking step C. of the present invention into account.

FIG. 2*a* shows the connector 1 and the socket 2 from FIGS. 1*a* and 1*b*, but now misaligned by an angular rotation alpha of 3 degrees about an axis 15 perpendicular to the direction 7 of the unique movement with respect to the mutual orientation of the connector 1 and socket 2 wherein the respective centre lines of the pins and holes of at least two pin-and-hole connection pairs coincide.

FIG. 2*b* shows again the cross section over line A-A', now with a small part of the protrusion 10 within the geometric boundaries of the socket 2. This effect is obtained by the misalignment of the connector 1 over the angle alpha of three degrees. As it is visible in FIG. 2*b*, there is a relatively much larger receiving space with a larger tolerance around the protruding part 10 of the connector 10. This makes it easier to position the connector 1 with respect to the socket 2, and thus enables the automation of the task, since less strict requirements are set.

FIGS. 3*a* and 3*b* show another configuration of the same connector 1 and socket 2, now with a misalignment beta of 15 degrees. Visible in the figure is that the tolerances 18 and 19 are much larger than those 12, 13 in FIG. 1*b*.

The examples given above show angles working for the CCS2 connector. For other connector and socket combinations there may be different optimal angles. This is not a problem in practice however, since the connector is coupled to a charger, and the charger may be equipped with a manipulator for the connector that is tailored to said specific connector. A working range for the connector and socket of any type can be determined up front, with one or more optimal misalignment angles.

In all embodiments within the scope of the present invention, uncertainty of the suspected (which may be a synonym for "alleged") position and orientation of the socket with respect to the connector (or vice versa) form the reason for adding a purposive misalignment. Both the uncertainty and the angle for which the misalignment has a beneficial effect may have a range, and the misalignment may be chosen, taking the uncertainty and direction of the suspected position into account. That means, that even with the worst estimate of the socket position, the misalignment is still in a range that facilitates the connection of connector and socket.

Figure 4A:
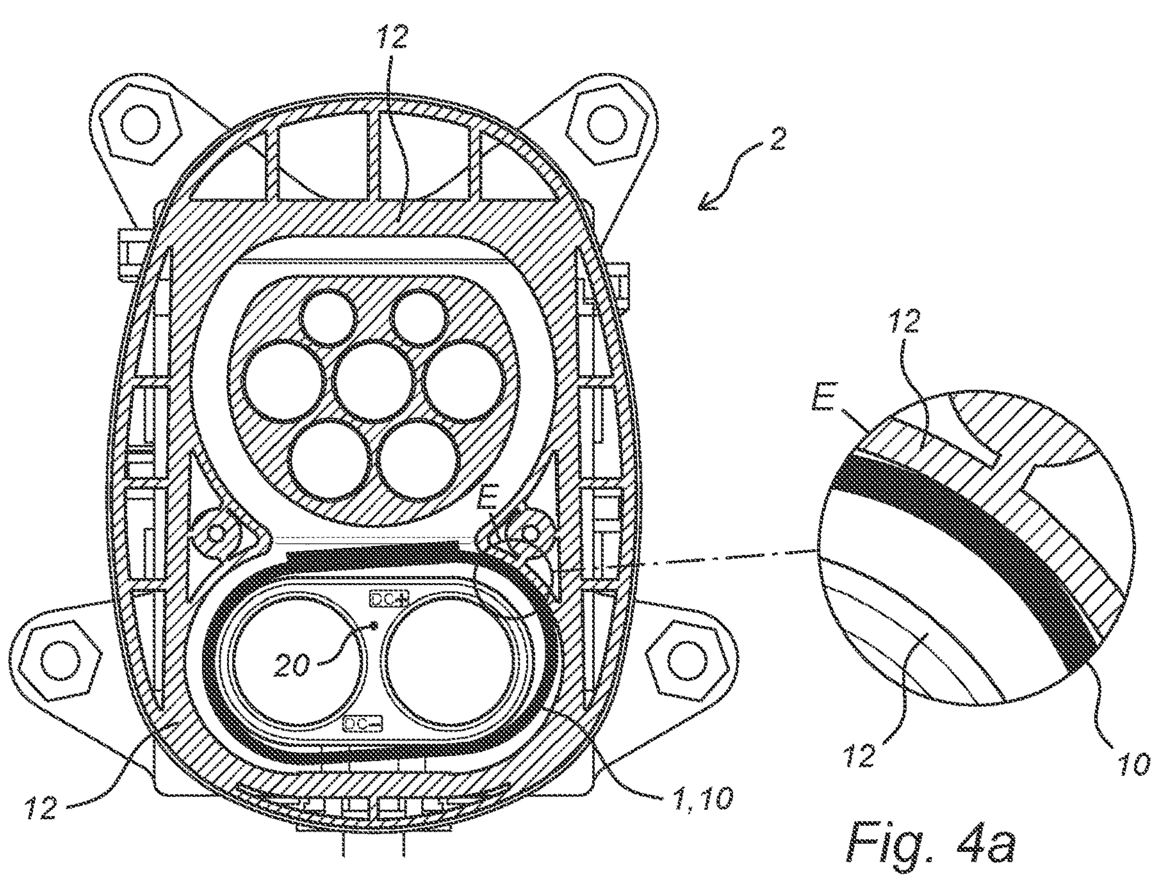

FIG. 4*a* shows a cross section of a situation wherein the connector 1 has an unintentional rotation about an axis 20, which is in a direction parallel to the centre lines of the pins and holes. This rotational direction is called roll, and the misalignment shown is 3 degrees. In section D it is visible that the connector 1 and the socket 10 touch due to the misalignment. In this orientation, it may not even be possible to connect the connector and the socket, because the remaining part of the connector may abut against the socket, and pins and holes are not outlined correctly.

Figure 4B:
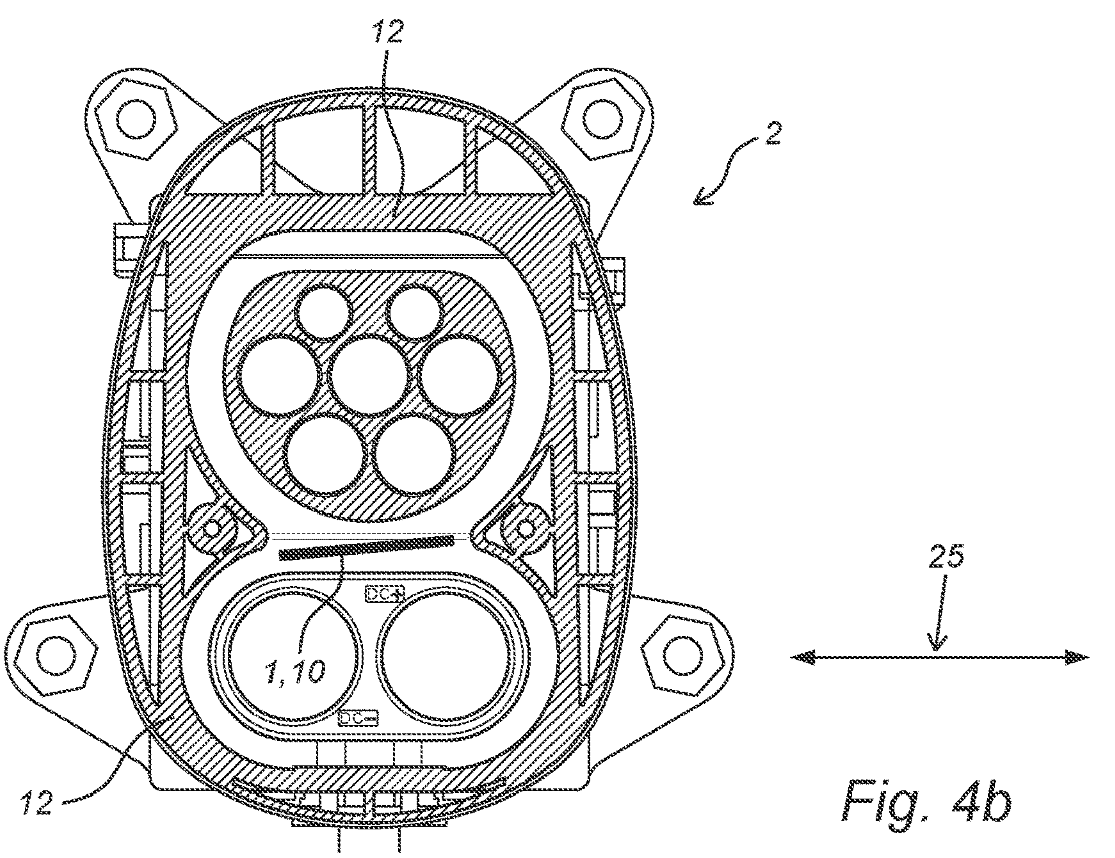

FIG. 4*b* shows the situation from FIG. 4*a* again, with an unintentional roll of 5 degrees, and an intentional rotation of three degrees about an axis 25, from left to right in the picture, called pitch. From the figure it appears that the connector doesn't touch the socket anymore, and the connector and socket may be connected by moving the connector in the direction 20 indicated in FIG. 4*a*.

Figure 4C:
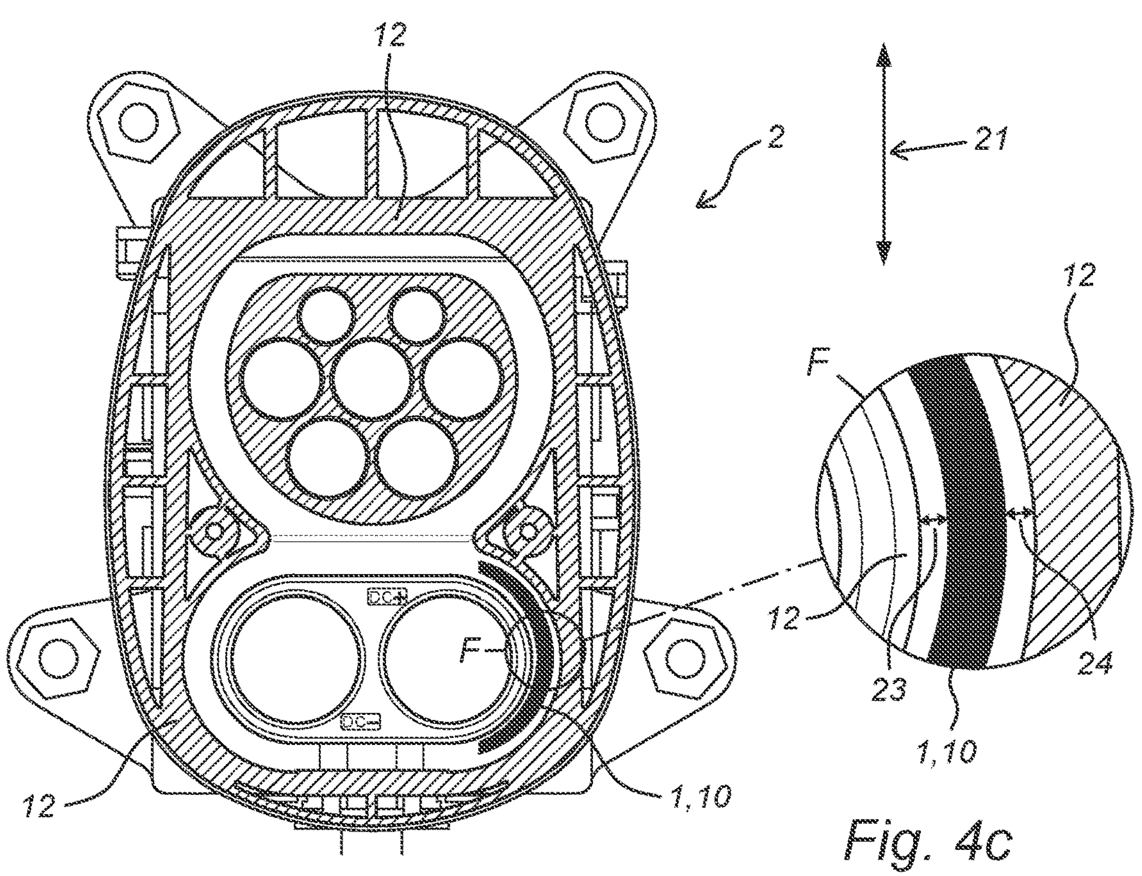

FIG. 4*c* shows an unintended rotational misalignment of three degrees about an axis in a direction 21 from top to bottom of the drawing, called yaw, with respect to the mutual orientation of the connector 1 and socket 2 wherein the respective centre lines of the pins and holes of at least two pin-and-hole connection pairs coincide. Play 23, 24 is indicated, setting constraints to the positioning of the connector 1 in the socket.

Figure 4D:
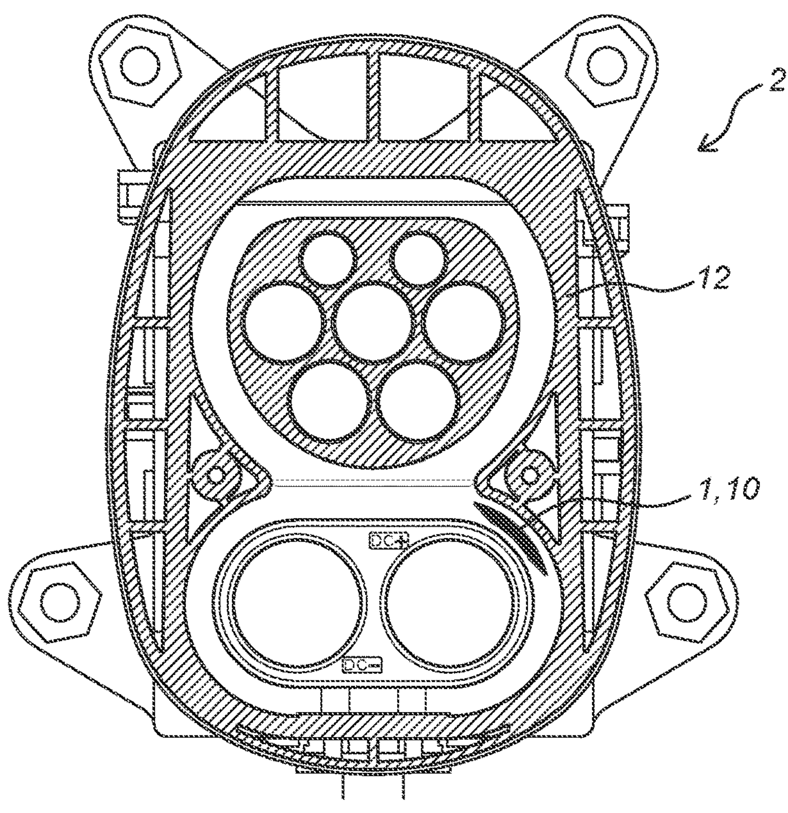

FIG. 4*d* shows the situation from FIG. 4*c* again, with an unintentional yaw of three degrees, and with an added intentional pitch of three degrees, setting less strict constraints to the positioning of the connector 1 in the socket, as is visible from the smaller part 10 of the connector in the socket, and thus adding more tolerance and making the connection easier. Compared with FIG. 4*c*, the effect of adding an intentional pitch to an unintentional yaw is visible.

The examples given are examples only and do not limit the scope of protection as defined by the following claims.

The invention claimed is:

1. A method of connecting a connector of an electric vehicle charger to a socket on an electric vehicle with a supposed position and orientation, wherein:

the connector and the socket:

each have multiple poles that are electrically mutually connectable by establishing electrically conductive pin-and-hole connection pairs, wherein the connector comprises a pin and the socket an associated hole, and/or the connector comprises a hole and the socket an associated pin, wherein:

each pin-and-hole pair has a centre line extending axially from the centre of the pin or hole concerned, which centre lines are parallel;

are connectable by one unique movement directed towards each other, which movement has:

a direction parallel to the direction of the centre lines of the pins and holes, and a mutual orientation of the connector and socket wherein the respective centre lines of the pins and holes of at least two pin-and-hole connection pairs coincide;

each comprise a housing; where the connector and socket housings:

are connectable by the same unique movement directed towards each other;

comprise mechanical guiding portions, protruding in a direction parallel to the direction of the centre lines beyond the end of the pins;

the method comprising the steps of:

A. determining the supposed position and orientation of the socket;

B. moving the connector in the direction of the supposed position of the socket with the aid of an automated actuator or manipulator;

C. positioning, with the aid of said automated actuator or said manipulator the connector adjacent to the supposed socket position of the connector, with at least an intentional angular rotation about an axis, wherein the angle between the axis and the direction of the unique movement is greater than zero, the direction of the unique movement being with respect to the mutual orientation of the connector and socket wherein the respective centre lines of the pins and holes of at least two pin-and-hole connection pairs coincide;

D. performing, by said automated actuator or manipulator, an active rotational manipulation of the connector thereby taking away said angular rotation between the supposed position and the adjacent position; and E. connecting, with the aid of said automated actuator or said manipulator the connector and socket by performing the unique movement directed towards each other.

2. The method according to claim 1, wherein steps D and E take place sequentially.

3. The method according to claim 2, wherein step D is triggered by the detection of the connector touching the socket, or by the determination or detection that a smallest distance between a part of the connector and a part of the connector has reached a predetermined threshold, such as less than 5 mm or more in particular less than 1 mm.

4. The method according to claim 1, wherein steps D and E take place at least partly simultaneously, in particular while applying a force and/or torque with at least a directional component in the direction of the unique movement directed towards each other.

5. The method according to claim 1, wherein the angular rotation takes place about an axis perpendicular to the direction of the unique mutually directed movement.

6. The method according to claim 1, wherein step D takes place while the connector is rotating about one or more contact points or lines with the socket.

7. The method according to claim 1, wherein step C comprises partially mating the connector and socket, such that they partially make contact.

8. The method according to claim 1, wherein in step D a rotation is caused by the guidance of the connector and/or socket housing.

9. The method according to claim 1, comprising placing the connector adjacent to the supposed position of the socket in addition to at least one rotational misalignment, also under a translational misalignment.

10. The method according to claim 1, wherein the supposed position and orientation are determined on the basis of data derived from:

a fixed parking position and known geometry of the vehicle for the purpose of charging;

data provided by the vehicle;

one or more sensors and/or cameras.

11. The method according to claim 1, wherein the supposed position and orientation of the socket is redetermined or recalculated during steps A-E, and wherein the movement is adjusted.

12. The method according to claim 1, wherein the connector is a CCS connector, and the angular rotation is between 0 and 20 degrees about an axis of rotation parallel to a connection line between the ends of the DC charging pins of the CCS connector, and in particular between 1 and 5 and more particularly around 3 or in particular between 12 and 18 degrees and more particularly around 15 degrees, or when connector is a type-1 connector, a type-2 connector, a CHAdeMO connector, a GB/T connector, an Euro-DIN connector, or when the connector is a ChaoJi connector, or a HPCCV connector.

13. A device for performing a method according to claim 1, comprising:

A manipulator for moving a connector of an electric vehicle charger having a socket on an electric vehicle in an supposed position and orientation, the manipulator being adapted to move the connector.

14. The device according to claim 13, wherein the manipulator is adapted to move the connector in at least 1, preferably at least 3 and more preferably at least 5 degrees of freedom.

15. The device according to claim 13, wherein the connector is suspended on the manipulator by means of a compliance, in at least one degree of freedom.

16. The device according to claim 13, comprising a compliance including a spring assembly.

* * * * *